United States Patent Office 3,739,028
Patented June 12, 1973

---

3,739,028
PREPARATION OF AMINES
Ralph W. Lagally and Johann G. D. Schulz, Pittsburgh, Pa., assignors to Gulf Research & Development Company, Pittsburgh, Pa.
No Drawing. Filed Nov. 24, 1969, Ser. No. 879,602
Int. Cl. C07c 85/04
U.S. Cl. 260—585 A                                     14 Claims

ABSTRACT OF THE DISCLOSURE

A process for preparing primary alkyl amines which involves reacting an alkyl halide with ammonia in a monohydric alcohol or a liquid saturated hydrocarbon wherein critical amounts of ammonia are used within a critical temperature range.

---

This invention relates to a process for the preparation of primary alkyl amines by the ammonolysis of alkyl halides.

In U.S. Pat. No. 3,299,142 of Simpson it is noted that when alkyl amines are prepared by the ammonolysis of alkyl halides in an alcoholic reaction medium, such as methanol or ethanol, the procedure results in the initial production of a hydrohalide salt which must be treated with a base, such as sodium hydroxide, in order to obtain the free amine. Simpson found that the process could be carried out without the formation of the hydrohalide salt and without recourse to the use of a base by the mere expedient of conducting the reaction in a liquid glycol reaction medium instead of an alcohol, such as methanol or ethanol.

We have found, despite Simpson's conclusion, that amines in the free state can be prepared in a monohydric alcohol, and, in fact, in a liquid saturated hydrocarbon, as a reaction medium, without the formation of a hydrohalide salt, which must be treated with a base to obtain the free amine, provided there is maintained a critical concentration of ammonia and ratio of ammonia to alkyl halide in the reaction mixture and the temperature during the reaction is maintained within a critical temperature range.

Alkyl halides which can be used herein can be defined, for example, by the following general formula

$$X-(CH_2)_n-Y,$$

wherein X can be iodine, chlorine or bromine, Y can be iodine, chlorine, bromine or hydrogen and $n$ can be an integer from one to 30, preferably from one to 20. In the above formula it is intended that X and Y be located at any position on the chain. Examples of alkyl halides which are therefore suitable herein are chloromethane, 2-iodopropane, 1-chloropentane, 3-chlorooctane, 1,6-dibromohexane, 1,4,7,10-tetrachlorodecane, 1,2,3,4,5,6-hexa chlorocyclohexane, 2-iodoeicosane, 2,20-dichlorotricontane, etc. Ammonia employed as a reactant herein can be liquid or gaseous, preferably liquid.

As noted, the concentration of ammonia in the reaction mixture is critical in order to obtain a free amine when using the monohydric alcohol or hydrocarbon as the reaction medium. Thus, the ammonia in the reaction mixture must be at least about 20 percent by weight, preferably at least about 35 percent by weight, especially from about 40 to about 90 percent by weight. The mol ratio of ammonia to alkyl halide must be at least about 10:1, preferably at least about 15:1, especially in the range of about 20:1 to about 100:1. The amount of monohydric alcohol or hydrocarbon present in the reaction mixture must be at least about five percent by weight, preferably at least about 12 percent by weight, especially from about 15 to about 50 percent by weight.

Additionally, it is critical herein that the reaction temperature be maintained within a range of about 30° to about 120° C., preferably within a range of about 70° to about 100° C. Although a pressure of about atmospheric to about 500 pounds per square inch gauge, or even higher, can be employed, a pressure of about 30 to about 100 pounds per square inch gauge is preferred. A reaction time of about 0.5 to about 100 hours, preferably about one to about 50 hours, will suffice.

The reaction medium is either a monohydric alcohol or a hydrocarbon. The monohydric alcohol will have from one to ten carbon atoms, preferably from one to six carbon atoms. Specific examples of monohydric alcohols that can be used are methanol, ethanol, isopropanol, tertiary butanol, diethyl carbinol, pentanol-1, hexanol-1, heptanol-1, octanol-2, nonanol-1, decanol-1, mixtures thereof, etc. The liquid saturated hydrocarbon that can be used herein can have from five to 16 carbon atoms, preferably from six to ten carbon atoms. Specific examples of hydrocarbons that can be used are normal pentane, normal hexane, 2-methyl heptane, normal decane, normal dodecane, normal tetradecane, normal hexadecane, mixtures thereof, etc.

At the end of the reaction period the primary alkyl amine is recovered from the reaction mixture in any suitable manner. For example, the reaction mixture can be cooled to room temperature and unreacted ammonia vented therefrom. The remainder of the reaction mixture will contain monohydric alcohol or hydrocarbon having free amines, predominantly free primary amines, dissolved therein. The by-product ammonium halide that was formed during the reaction will have precipitated therefrom. Simple filtration will suffice to separate the ammonium halide from the solution. The latter can then be subjected to distillation, for example, a temperature of about 25° to about 300° C. and a pressure of about 0.01 to about 15 pounds per square inch gauge, to remove monohydric alcohol or hydrocarbon therefrom. To recover primary amines from any secondary and/or tertiary amines admixed therewith, the remaining product can be subjected to distillation, for example, a temperature of about 25° to about 300° C. and a pressure of about 0.01 to about 15 pounds per square inch gauge. The primary amines will come off first and can be readily recovered.

The process can further be illustrated by the following:

EXAMPLE I

A one-liter autoclave was charged with 86.5 grams (0.45 mol) of normal octyl bromide, 130 milliliters of ethylene glycol and, after cooling to —40° C., 170 grams (10 mols) of liquefied anhydrous ammonia. The autoclave was sealed, heated to 80° C. and maintained at this temperature for two hours. The autoclave was then cooled, excess ammonia vented, and the crude product removed. The autoclave was washed several times with glycol, and the combined product and washings extracted five times with carbon tetrachloride. Evaporation of the combined extracts gave 69.1 grams of pale yellow residue. Gas chromatographic analysis of the mixture showed that n-octyl amine was produced in 68.0 percent efficiency, dioctyl amine in 18.5 percent efficiency, and trioctyl amine in 3.2 percent efficiency, with 100 percent conversion of the starting octyl bromide.

EXAMPLE II

A one-liter autoclave was charged with 96.5 grams (0.50 mol) of normal octyl bromide, a mixture of 75 millilters of n-propyl alcohol and 75 milliliters of hexane, and, after cooling to −40° C., 170 grams (10 mols) of liquefied anhydrous ammonia. The autoclave was sealed, heated to 80° C., and maintained at this temperature for two hours. The autoclave was then cooled, excess ammonia vented, and the crude product removed. The autoclave was washed several times with hexane, and the washings added to the product. The solid ammonium bromide was filtered off and washed with hexane and amounted to 42 grams, corresponding to a 85.7 percent efficiency. The combined filtrate and washings were evaoprated, yielding 72.7 grams of pale yellow residue. Gas chromatographic analysis of the mixture showed that n-octyl amine was produced in 64.3 percent efficiency, dioctyl amine in 18.8 percent efficiency, and trioctylamine in 3.2 percent efficiency, with 100 percent conversion of the starting octyl bromide.

EXAMPLE III

A one-liter autoclave was charged with 96.5 grams (0.50 mol) of normal octyl bromide, 150 milliliters of hexane and, after cooling to −40° C., 170 grams (10 mols) of liquefied anhydrous ammonia. The autoclave was sealed, heated to 80° C., and maintained at this temperature for two hours. The autoclave was then cooled, excess ammonia vented, and the crude product removed. The autoclave was washed several times with hexane, and the washings added to the product. The precipitated ammonium bromide was filtered off and washed with hexane. The solid ammonium bromide amounted to 45 grams, corresponding to a 91.8 percent efficiency. The combined filtrate and washings were evaporated, yielding 63.5 grams of pale yellow residue. Gas chromatographic analysis of the mixture showed that n-octyl amine was formed in 57.5 percent efficiency, dioctylamine in 26.6 percent efficiency, and trioctyl amine in 2.8 percent efficiency, with 100 percent conversion of starting octyl bromide.

EXAMPLE IV

A one-liter autoclave was charged with 96.5 grams (0.50 mol) of normal octyl bromide, 150 milliliters of n-propyl alcohol, and, after cooling to −40° C., 170 grams (10 mols) of liquefied anhydrous ammonia. The autoclave was sealed, heated to 80° C., and maintained at this temperature for two hours. The autoclave was then cooled, excess ammonia vented, and the crude product removed. The autoclave was washed several times with hexane, the washings added to the product, and the product diluted with more hexane. The precipitated ammonium bromide was filtered off and washed with hexane. The solid ammonium bromide amounted to 42 grams, corresponding to a 85.7 percent efficiency. Evaporation of the combined filtrate and washings gave 62.3 grams of pale yellow residue. Gas chromatographic analysis of the mixture showed that n-octyl amine was formed in 69.0 percent efficiency, dioctyl amine in 16.2 percent efficiency, and trioctylamine in 4.2 percent efficiency, with 100 percent conversion of starting octyl bromide.

EXAMPLE V

A one-liter autoclave was charged with 96.5 grams (0.50 mol) of normal octyl bromide, 150 milliliters of methanol, and, after cooling to −40° C., 170 grams of liquefied anhydrous ammonia. The autoclave was sealed, heated to 80° C., and maintained at this temperature for two hours. The autoclave was then cooled, excess ammonia vented, and the crude product removed. The autoclave was washed several times with hexane, and the combined washings, and product extracted six times with hexane. Evaporation of the combined hexane extracts gave 57.8 grams of pale yellow residue. Gas chromatographic analysis of the mixture showed that n-octyl amine was formed in 61.2 percent efficiency, dioctyl amine in 21.7 percent efficiency, and trioctyl amine in 2.1 percent efficiency. Evaporation of the methanol layer gave 42.5 grams of ammonium bromide, corresponding to an efficiency of 86.7 percent.

EXAMPLE VI

A 300-milliliter autoclave was charged with 36.0 grams (0.19 mol) of n-octyl bromide and 100 milliliters of methanol, and, after cooling to −40° C. with a Dry Ice-acetone bath, 17 grams (one mol) of liquefied anhydrous ammonia. The autoclave was sealed, heated to 80° C., and maintained at this temperature for two hours. The autoclave was then cooled to room temperature, excess ammonia vented, and the crude product removed. The autoclave was washed several times with hexane, and the washings added to the product. The product was extracted four times with hexene, and the combined hexane fractions evaporated, yielding 13.7 grams of an oily residue. Gas chromatographic analysis of the mixture showed that n-octyl amine was produced in 4.4 percent efficiency, dioctyl amine in 31.2 percent efficiency, and trioctyl amine in 10.0 percent efficiency, with 100 percent conversion of the starting octyl bromide.

Evaporation of the methanolic residue to dryness yielded 17.8 grams of a pale yellow solid. Treatment with aqueous base followed by extraction with chloroform and evaporation of the solvent under reduced pressure gave an additional 12.8 grams of product. Gas chromatographic analysis showed that n-octyl amine was produced in 35.5 percent efficiency and dioctyl amine in 4.9 percent efficiency.

EXAMPLE VII

A 300-milliliter autoclave was charged with 36.0 grams (0.19 mol) of n-octyl bromide and 50 milliliters of methanol, and, after cooling to −40° C. with a Dry Ice-acetone bath, 17 grams (one mol) of liquefied anhydrous ammonia. The autoclave was sealed, heated to 80° C., and maintained at this temperature for two hours. The autoclave was then cooled to room temperature, excess ammonia vented, and the crude product removed. The autoclave was washed several times with hexane, and the washings added to the product. The product was further diluted with hexane, and the solvents partially evaporated under reduced pressure. Precipitated solids were removed, and the remainder of the solvent evaporated, yielding 43.6 grams of oily product. Gas chromatographic analysis showed that n-octyl amine was formed in 4.7 percent efficiency, dioctyl amine in 28.4 percent efficiency, and trioctyl amine in 26.7 percent efficiency, with 87 percent conversion of the starting octyl bromide. The precipitated solid amounted to 15.9 grams.

EXAMPLE VIII

A 300-milliliter autoclave was charged with 12.9 grams (0.07 mol) of octyl bromide and 150 milliliters of methanol, and, after cooling to −40° C. with a Dry Ice-acetone bath, 6.0 grams (0.35 mol) of liquefied anhydrous ammonia. The autoclave was sealed, heated to 80° C., and maintained there for two hours. The autoclave was then cooled, excess ammonia vented, and the crude product removed. The autoclave was washed several times with hexane, and the washings added to the product. The product was extracted several times with hexane, and the combined hexane fractions evaporated under reduced pressure, yielding 4.8 grams of an oily substance. Gas chromatographic analysis showed that octyl amine was formed in 13.8 percent efficiency, dioctyl amine in 24.9 percent efficiency, and trioctyl amine in 7.7 percent efficiency, with 92.5 percent conversion of starting octyl bromide. Evaporation of the methanolic residue yielded 10.0 grams of solid material.

The above runs can be summarized below in Table I.

TABLE I

| Example | Alkyl halide | Reaction medium | Molar ratio of NH₃ to alkyl halide | Percent by weight of NH₃ in reaction mixture | Percent by weight of reaction medium in reaction mixture | Percent conversion of alkyl halide | Efficiency to— | | |
|---|---|---|---|---|---|---|---|---|---|
| | | | | | | | Primary amine | Secondary amine | Tertiary amine |
| I | n-Octyl bromide | Ethylene glycol | 22 | 42.5 | 35.8 | 100 | 68.0 | 18.5 | 3.2 |
| II | do | n-Propyl alcohol, hexane | 20 | 45.5 | 28.7 | 100 | 64.3 | 18.8 | 3.2 |
| III | do | Hexane | 20 | 46.5 | 27.1 | 100 | 57.5 | 26.6 | 2.8 |
| IV | do | n-Propyl alcohol | 20 | 44.6 | 30.1 | 100 | 69.0 | 16.2 | 4.2 |
| V | do | Methanol | 20 | 44.0 | 31.0 | 100 | 61.2 | 21.7 | 2.1 |
| VI | do | do | 5 | 4.3 | 86.4 | 100 | 4.4 | 31.2 | 10.0 |
| VII | do | do | 5 | 18.2 | 43.1 | 87.0 | 4.7 | 28.4 | 28.7 |
| VIII | do | do | 5 | 12.8 | 60.1 | 92.5 | 13.8 | 24.9 | 7.7 |

The advantages of operating in accordance with our invention are apparent from a consideration of the data in Table I. Examples II through V, inclusive, show that operation within the scope of the claimed process results in conversion of all of the alkyl halide charge and that the free amines produced are substantially the desired primary amines. The results obtained are comparable in scope to those obtained in Example I using ethylene glycol as reaction medium. That operation outside the scope of our invention will not result in substantial amounts of free amines, and that such free amines that are formed are not primary amines is evident from an examination of Examples VI, VII and VIII.

Obviously, many modifications and variations of the invention, as hereinabove set forth, can be made without departing from the spirit and scope thereof, and therefore only such limitations should be imposed as are indicated in the appended claims.

We claim:

1. A process for preparing a free, non-combined primary amine which consists in heating an unsubstituted alkyl halide having from one to 30 carbon atoms, wherein the halogen portion can be selected from the group consisting of iodine, chlorine and bromine, ammonia and a monohydric alkyl alcohol having from one to 10 carbon atoms or a liquid saturated alkyl hydrocarbon having from five to 16 carbon atoms at a temperature of about 30° to about 120° C. and a pressure of about atmospheric to about 500 pounds per squire inch gauge for about 0.5 to about 100 hours, wherein the amount of ammonia in the reaction mixture is at least about 20 percent by weight, the mol ratio of ammonia to said alkyl halide is from about 10:1 to about 100:1 and the amount of said monohydric alcohol or said hydrocarbon in the reaction mixture is from about five to about 50 percent by weight.

2. The process of claim 1 wherein the reaction medium is a monohydric alkyl alcohol having from one to ten carbon atoms.

3. The process of claim 1 wherein the reaction medium is a monohydric alkyl alcohol having from one to six carbon atoms.

4. The process of claim 1 wherein the reaction medium is methanol.

5. The process of claim 1 wherein the reaction medium is normal propyl alcohol.

6. The process of claim 1 wherein the reaction medium is a liquid saturated alkyl hydrocarbon having from five to 16 carbon atoms.

7. The process of claim 1 wherein the reaction medium is a liquid saturated alkyl hydrocarbon having from six to ten carbon atoms.

8. The process of claim 1 wherein the reaction medium is hexane.

9. The process of claim 1 wherein the molar ratio of ammonia to said alkyl halide is in the range of about 20:1 to about 100:1.

10. The process of claim 1 wherein the concentration of ammonia in the reaction mixture is at least about 35 percent by weight.

11. The process of claim 1 wherein the concentration of ammonia in the reaction mixture is from about 40 to about 90 percent by weight.

12. The process of claim 1 wherein the amount of reaction medium is about 15 to about 50 percent by weight.

13. The process of claim 1 wherein the reaction temperature is in the range of about 70° to about 100° C.

14. The process of claim 1 wherein said alkyl halide is normal octyl bromide.

References Cited
UNITED STATES PATENTS

| 3,399,236 | 8/1968 | Mills, Jr. | 260—585 A |
| 3,487,111 | 12/1969 | Kurtz et al. | 260—585 A |
| 3,299,142 | 1/1967 | Simpson | 260—585 A |

LEWIS GOTTS, Primary Examiner

C. F. WARREN, Assistant Examiner